(12) United States Patent
Desai (10) Patent No.: US 6,434,608 B1
(45) Date of Patent: Aug. 13, 2002

(54) METHODS AND APPARATUS FOR CACHING NETWORK TRAFFIC

(75) Inventor: Arun Raghavendra Desai, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/259,149

(22) Filed: Feb. 26, 1999

(51) Int. Cl.[7] .............................................. G06F 13/00
(52) U.S. Cl. ..................... 709/217; 709/219; 709/203; 711/118
(58) Field of Search .................................. 709/217, 218, 709/226, 224, 216, 223, 219; 711/118

(56) References Cited

U.S. PATENT DOCUMENTS

| | | | |
|---|---|---|---|
| 4,827,411 A | 5/1989 | Arrowood et al. | 364/300 |
| 4,965,772 A | 10/1990 | Daniel et al. | 364/900 |
| 5,442,771 A | * 8/1995 | Filepp et al. | 709/219 |
| 5,555,244 A | 9/1996 | Gupta et al. | 370/60.1 |
| 5,673,265 A | 9/1997 | Gupta et al. | 370/432 |
| 5,852,717 A | * 12/1998 | Bhide et al. | 709/203 |
| 5,924,116 A | * 7/1999 | Aggarwal et al. | 711/122 |
| 5,935,207 A | * 8/1999 | Logue et al. | 709/219 |
| 5,940,594 A | * 8/1999 | Ali et al. | 709/203 |
| 5,987,233 A | * 11/1999 | Humphrey | 709/217 |
| 6,154,811 A | * 11/2000 | Srbljic et al. | 711/118 |
| 6,167,438 A | * 12/2000 | Yates et al. | 709/216 |
| 6,237,060 B1 | * 5/2001 | Shilts et al. | 711/100 |

OTHER PUBLICATIONS

Valloppillil, Vinod, "Cache Array Routing Protocol v1.0", Oct. 20, 1997, Internet–Draft, http://ds1.internic/net/internet–drafts/draft–vinod–carp–v1–02.txt, pp. 1–6.
Cisco Technology, Inc., "Configuring IP Routing Protocols," Dec. 10, 1997, http://www.cisco.com/univercd/data/doc/software/11__2/cnp1/5cnp1/5ciprout.htm#REF40277, pp. 1–6 and 120–122.
Ousterhout, John K., et al. "A Trace–Driven Analysis of the UNIX 4.2 BSD File System," Jan. 2, 1993, *Computer Science Division, Electrical Engineering and Computer Science*, University of California, Berkeley, CA, pp. 1–12.
Ousterhout, John K., et al. "Beating the I/O Bottleneck: A Case for Log–Structured File Systems," *Computer Science Division, Electrical Engineering and Computer Sciences*, University of California, Berkeley, CA, pp. 1–18.
Welch, Brent, "A Comparison of the Vnode and Sprite File System Architectures," *Proceedings of the USENIX File System Workshop*, May 1992, 18 pages.

* cited by examiner

Primary Examiner—Dung C. Dinh
Assistant Examiner—Abdullahi E. Salad
(74) Attorney, Agent, or Firm—Beyer Weaver & Thomas, LLP (57) ABSTRACT

Methods and apparatus are described for caching a first data object in a cache. In response to a data request for the first data object, it is determined whether the first data object is currently cached. Where the first data object is not currently cached, it is determined whether to cache the first data object with reference to at least one parameter associated with the first data object.

31 Claims, 5 Drawing Sheets

METHODS AND APPARATUS FOR CACHING NETWORK TRAFFIC

BACKGROUND OF THE INVENTION

The present invention relates to transmission of data in a network environment. More specifically, the present invention relates to methods and apparatus for improving the efficiency with which data are transmitted over the Internet. Still more specifically, the present invention provides techniques by which the efficiency of an Internet cache may be improved.

Generally speaking, when a client platform communicates with some remote server, whether via the Internet or an intranet, it crafts a data packet which defines a TCP connection between the two hosts, i.e., the client platform and the destination server. More specifically, the data packet has headers which include the destination IP address, the destination port, the source IP address, the source port, and the protocol type. The destination IP address might be the address of a well known World Wide Web (WWW) search engine such as, for example, Yahoo, in which case, the protocol would be TCP and the destination port would be port 80, a well known port for http and the WWW. The source IP address would, of course, be the IP address for the client platform and the source port would be one of the TCP ports selected by the client. These five pieces of information define the TCP connection.

Given the increase of traffic on the World Wide Web and the growing bandwidth demands of ever more sophisticated multimedia content, there has been constant pressure to find more efficient ways to service data requests than opening direct TCP connections between a requesting client and the primary repository for the desired data. Interestingly, one technique for increasing the efficiency with which data requests are serviced came about as the result of the development of network firewalls in response to security concerns. In the early development of such security measures, proxy servers were employed as firewalls to protect networks and their client machines from corruption by undesirable content and unauthorized access from the outside world. Proxy servers were originally based on Unix machines because that was the prevalent technology at the time. This model was generalized with the advent of SOCKS which was essentially a daemon on a Unix machine. Software on a client platform on the network protected by the firewall was specially configured to communicate with the resident demon which then made the connection to a destination platform at the client's request. The demon then passed information back and forth between the client and destination platforms acting as an intermediary or "proxy."

Not only did this model provide the desired protection for the client's network, it gave the entire network the IP address of the proxy server, therefore simplifying the problem of addressing of data packets to an increasing number of users. Moreover, because of the storage capability of the proxy server, information retrieved from remote servers could be stored rather than simply passed through to the requesting platform. This storage capability was quickly recognized as a means by which access to the World Wide Web could be accelerated. That is, by storing frequently requested data, subsequent requests for the same data could be serviced without having to retrieve the requested data from its original remote source. Currently, most Internet service providers (ISPs) accelerate access to their web sites using proxy servers.

Unfortunately, interaction with such proxy servers is not transparent, requiring each end user to select the appropriate proxy configuration in his or her browser to allow the browser to communicate with the proxy server. For the large ISPs with millions of customers there is significant overhead associated with handling tech support calls from customers who have no idea what a proxy configuration is. Additional overhead is associated with the fact that different proxy configurations must be provided for different customer operating systems. The considerable economic expense represented by this overhead offsets the benefits derived from providing accelerated access to the World Wide Web. Another problem arises as the number of WWW users increases. That is, as the number of customers for each ISP increases, the number of proxy servers required to service the growing customer base also increases. This, in turn, presents the problem of allocating packet traffic among multiple proxy servers.

Another technique for increasing the efficiency with which data requests are serviced is described in commonly assigned, copending U.S. patent application Ser. No. 08/946, 867 for METHOD AND APPARATUS FOR FACILITATING NETWORK DATA TRANSMISSIONS filed Oct. 8, 1997 now U.S. Pat. No. 6,240,461, the entirety of which is incorporated herein by reference for all purposes. The invention described in that copending application represents an improvement over the proxy server model which is transparent to end users, high performance, and fault tolerant. By altering the operating system code of an existing router, the router is enabled to redirect data traffic of a particular protocol intended for a specified port, e.g., TCP with port 80, to one or more caching engines connected to the router via an interface having sufficient bandwidth such as, for example, a 100 baseT interface. If there are multiple caching engines connected to the cache-enabled router, the router selects from among the available caching engines for a particular request based on a simple algorithm according to which a particular group of addresses is associated with each caching engine.

The caching engine to which the request is re-routed "spoofs" the requested destination platform and accepts the request on its behalf via a standard TCP connection established by the cache-enable router. If the requested information is already stored in the caching engine, i.e., a cache "hit" occurs, it is transmitted to the requesting platform with a header indicating its source as the destination platform. If the requested information is not in the caching engine, i.e., a cache "miss" occurs, the caching engine opens a direct TCP connection with the destination platform, downloads the information, stores it for future use, and transmits it to the requesting platform. All of this is transparent to the user at the requesting platform which operates exactly as if it were communicating with the destination platform. Thus, the need for configuring the requesting platform to suit a particular proxy configuration is eliminated along with the associated overhead. Moreover, traffic may be easily allocated among as many caching engines as become necessary. Thus, content caching provides a way to compensate for the bandwidth limitations discussed above.

The success of content caching in compensating for bandwidth limitations corresponds directly to the efficiency with which the caching engines operate. The higher the cache hit rate, i.e., cache hits as a percentage of the total number of requests, the greater the bandwidth savings. For a typical caching engine, the cache hit rate is approximately 30 to 40%. This percentage includes cache misses for non-cacheable objects. This means that 60 to 70% of objects stored in caching engines are never used again. That is, 60 to 70% of the caching engine's storage is used to store objects which will never be requested again. In addition, because new objects are constantly replacing old objects, it is likely that some of the 30 to 40% of objects which are likely to be requested more than once are being overwritten by the objects which will never be requested again. It is therefore clear that the typical caching engine is working nowhere near the level of efficiency which is at least theoretically possible.

It is therefore desirable to provide methods and apparatus for improving the efficiency with which caching engines store objects.

SUMMARY OF THE INVENTION

According to the present invention, methods and apparatus are provided by which cache engine efficiency is improved. The present invention achieves this efficiency improvement by favoring the caching of objects which are statistically likely to be requested again. According to a one embodiment, when a caching engine experiences an initial cache miss for a requested object, the object is retrieved and sent to the requesting host but the object is not cached. Instead, the caching engine makes an entry corresponding to the requested object in a table in which it tracks objects for which at least one cache miss has occurred. If another request for the object is received, the object is retrieved, sent to the requesting host, and, because an entry corresponding to the requested object exists in the table, the object is cached. In other words, an object is only cached if it has been requested at least twice. The idea is that if an object has been requested two or more times it is statistically more likely to be requested again than an object for which only one request has been received. It follows then that, because the cache is populated only by objects which are likely to be requested, cache efficiency is correspondingly improved.

According to various specific embodiments, the number of cache misses after which an object is cached, i.e., the caching threshold, varies. According to one specific embodiment, the number of cache misses may be set in accordance with per-object hit rate statistics. That is, the percentages of objects with various different numbers of cache misses/hits may be monitored to determine how many misses to require before an object is cached. The number should be set both to improve cache hit efficiency as well as keep the cache fully populated.

According to other embodiments, the caching threshold varies dynamically with the network retrieval cost associated with individual requested objects. For example, where the retrieval cost for an object is very high, i.e., the object is very large, it might be cached upon the first cache miss. However, where the retrieval cost is relatively low, i.e., the object is relatively small, an object might not be cached until after two or more cache misses. According to various embodiments, a variety of system level metrics are used to determine where to set the caching threshold. Such metrics may include, but are not limited to, whether the cache is empty or partially full, whether the cache is idle, and the frequency with which the entire contents of the cache are overwritten by new objects.

Thus, the present invention provides methods and apparatus for caching a first data object in a cache. In response to a data request for the first data object, it is determined whether the first data object is currently cached. Where the first data object is not currently cached, it is determined whether to cache the first data object with reference to at least one parameter associated with the first data object.

According to a specific embodiment, the at least one parameter comprises a miss count corresponding to a number of times a cache miss for the first data object has occurred, and determining whether to cache the first data object comprises referring to the miss count. The first data object is cached where the first data object is not currently cached and where more than one cache miss corresponding to the first data object has occurred.

Other methods and apparatus for caching a first object in a network cache are described. The first data object is written to a data buffer in the network cache. The first data object is then written from the data buffer to nonvolatile memory in the network cache. The first data object is then removed from the data buffer in response to writing the first data object to nonvolatile memory.

A further understanding of the nature and advantages of the present invention may be realized by reference to the remaining portions of the specification and the drawings.

DESCRIPTION OF SPECIFIC EMBODIMENTS

Figure 1:
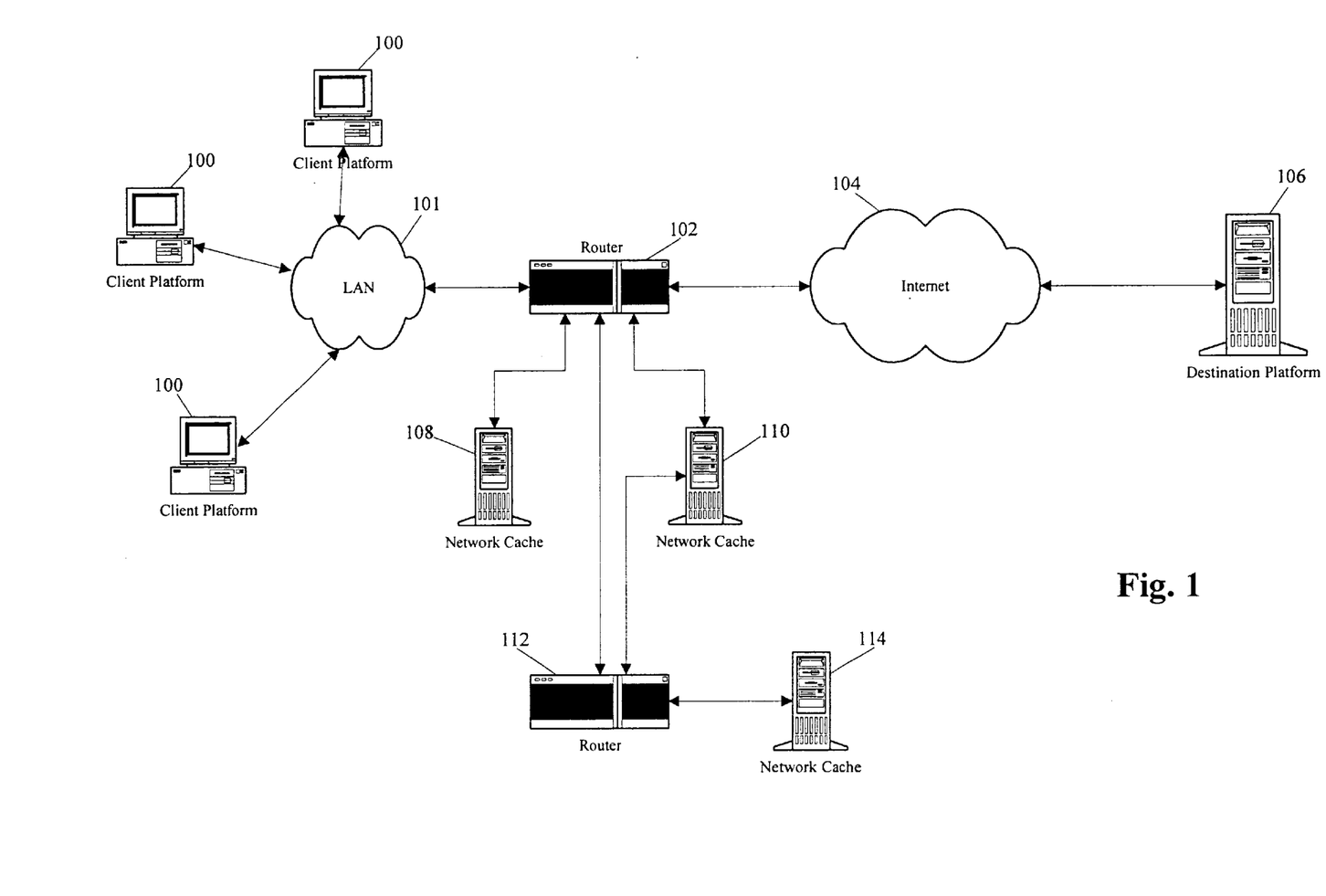
FIG. 1 is a block diagram of a network environment in which specific embodiments of the present invention may be implemented.

FIG. 1 shows a hardware environment in which the present invention may be implemented. A plurality of client platforms 100 are interconnected via LAN 101. LAN 101 is connected to router 102 which is connected via network 104 to destination platform 106. It will be assumed for the purposes of this discussion that client platforms 100 are single personal computers or work stations, that router 102 connects platform 100 to the Internet, i.e., network 104, and that destination platform 106 is a server on the World Wide Web. It should be noted, however, that a variety of configurations similar to this simple model may be employed without departing from the scope of the invention. For example, client platforms 100 could be connected via a wide area network. Router 102 could be an internal router in a LAN or a WAN (e.g., an intranet connection to an internal web page), the network's general gateway to the Internet, a direct connection to destination platform 106, or some intermediate platform between the network and destination platform 106. The connection between router 102 and client platforms 100 could include several intervening routers. Network 104 could represent a local or wide area network which includes client platforms 100 and router 102, or the Internet. Destination platform 106 could be part of the local or wide area network, or a remote server on the Internet. Referring back to FIG. 1, network caches 108 and 110 are connected to router 102. Additional router 112 is connected to router 102 and has an additional network cache 114 connected thereto.

It will be understood that the network caches described herein may employ any of a variety of existing file systems and remain within the scope of the invention. For example, the invention may be implemented using a Unix general purpose file system or the equivalent. A particular embodiment of the invention employs the file system described in commonly assigned, copending U.S. patent application Ser. No. 08/937,966 for CACHE MEMORY FILE SYSTEM filed on Sep. 25, 1997 now U.S. Pat. No. 5,950,205, the entire specification of which is incorporated herein by reference for all purposes.

During normal operation, a client platform 100 transmits a request to retrieve data such as, for example, a multimedia object from destination platform 106. Cache-enabled router 102 receives the request in the form of at least one data packet. Router 102 reads the packet header to determine whether, for example, it is a TCP packet and indicates port 80 as its destination port. If the packet is of a different protocol or is not destined for the World Wide Web, the packet is simply passed through the router and routed according to standard Internet protocols.

If, on the other hand, the packet is TCP and port 80 is specified, router 102 determines to which of its associated network caches (108 and 110) it will redirect the packet based on the destination IP address specified in the packet. Before sending the packet to one of its associated network caches, router 102 encapsulates the packet for transmission to the selected network cache by adding another TCP/IP header which designates the router as the source of the packet and the network cache as the destination. That is, the router encapsulates the packet for transmission to a network cache which might be several "hops" away. So, for example, router 102 might encapsulate the packet for transmission to network cache 114 which is connected to router 102 via router 112. Thus, not only may multiple network caches be associated with a particular router, but multiple routers may be supported by an individual network cache or a group of network caches. This allows a tremendous amount of flexibility in where the network cache and router need to be in relation to each other.

A TCP connection is established between the client and the selected network cache and router 102 transmits the encapsulated packet to the network cache. The network cache determines if it has the requested object stored locally by comparing the destination URL to its directory. If the object is determined to be locally stored in the network cache, it is transmitted to client platform 100. If, on the other hand the object is not in the cache, the network cache makes its own request for the object (using its own address as the source IP address) to destination platform 106 via router 102. That is, router 102 establishes a TCP connection between the network cache and destination platform 106. The router sees that the new request is from the network cache (by looking at the source address) and thereby knows not to redirect the packet to the network cache. This request and the subsequent retrieval of the object from destination platform 106 is done according to standard TCP/IP protocols. The retrieved object is then transmitted to client platform 100. As will be discussed below with reference to the flowchart of FIG. 3, the retrieved object is not necessarily stored in the memory of the network cache after the first cache miss. Rather, the object is typically cached only after at least one other miss occurs. As will be discussed below, according to some embodiments, there are exceptions to this general rule.

Figure 2:
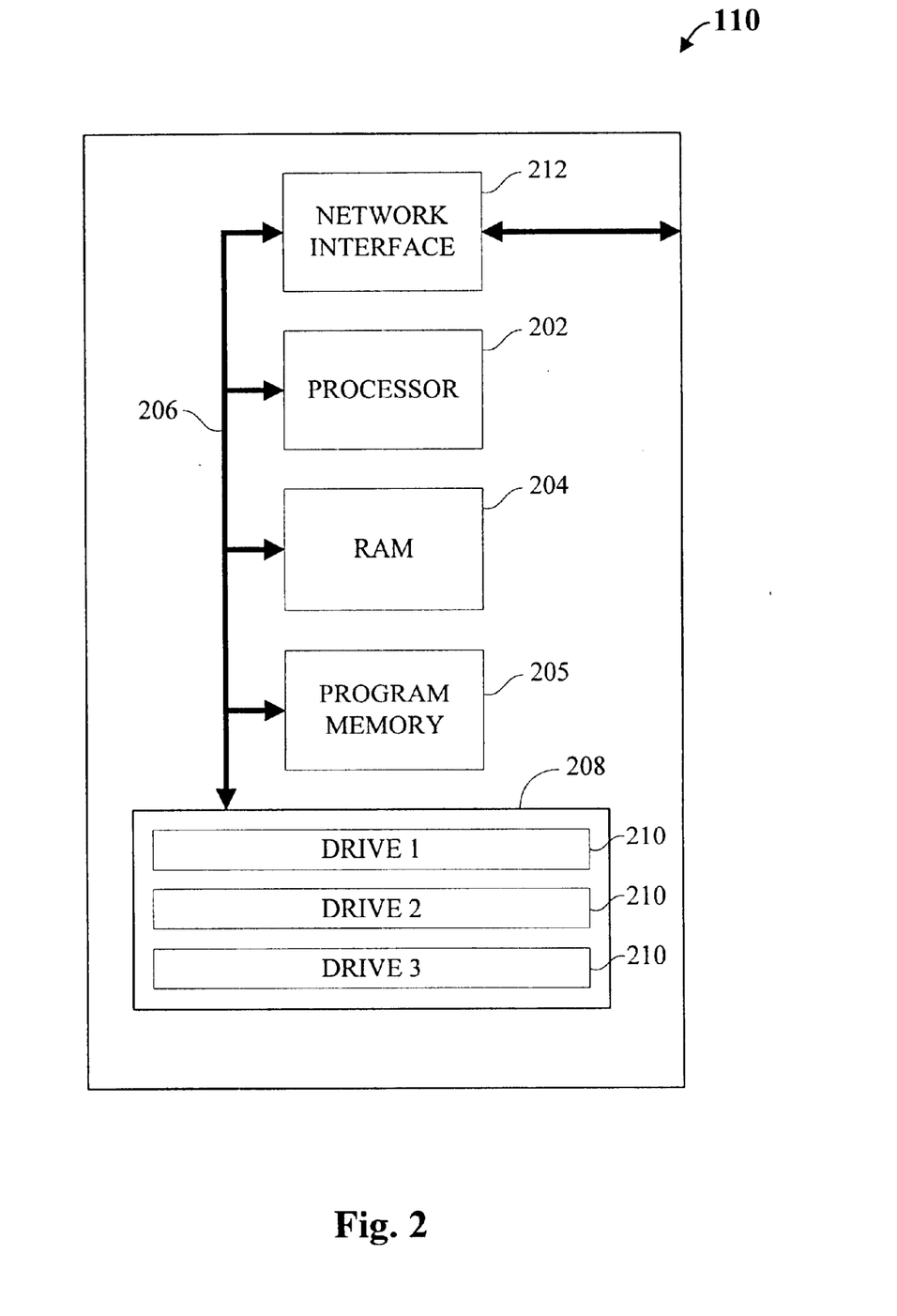
FIG. 2 is a block diagram of a network cache for use with specific embodiments of the present invention.

FIG. 2 is a block diagram of a network cache such as, for example, cache 110 of FIG. 1. A central processor 202 controls operation of cache 110 and its various subsystems using system memory 204 and bus 206. Data objects are stored in cache nonvolatile memory 208 which, in a specific embodiment, comprises three SCSI drives 210. A network interface 212 enables communication with external devices. Portions of SCSI drives 210 may also be employed for other purposes such as, for example, storing operating and file systems for cache 110, or storing software code for directing the operation of various functionalities of cache 110. Alternatively, program instructions for execution by processor 202 directing operation of the functionalities of cache 110 may be stored in a separate program memory 205. It will be understood that the cache architecture shown in FIG. 2 is merely illustrative and should not be construed to limit the scope of the present invention. That is, any of a wide variety of cache architectures may be employed to implement the present invention.

Figure 3:
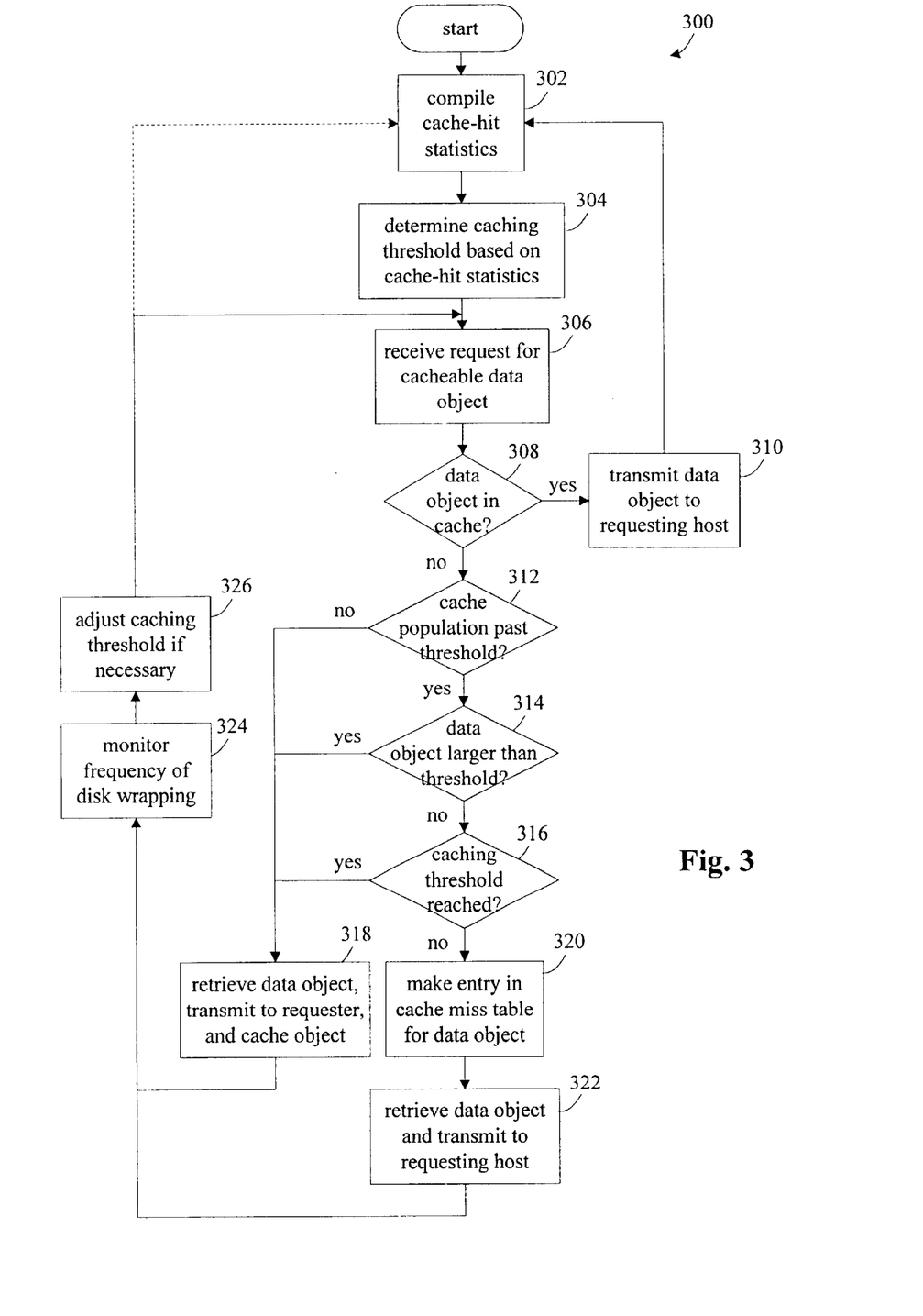
FIG. 3 is a flowchart illustrating operation of a specific embodiment of the present invention.
Figure 4:
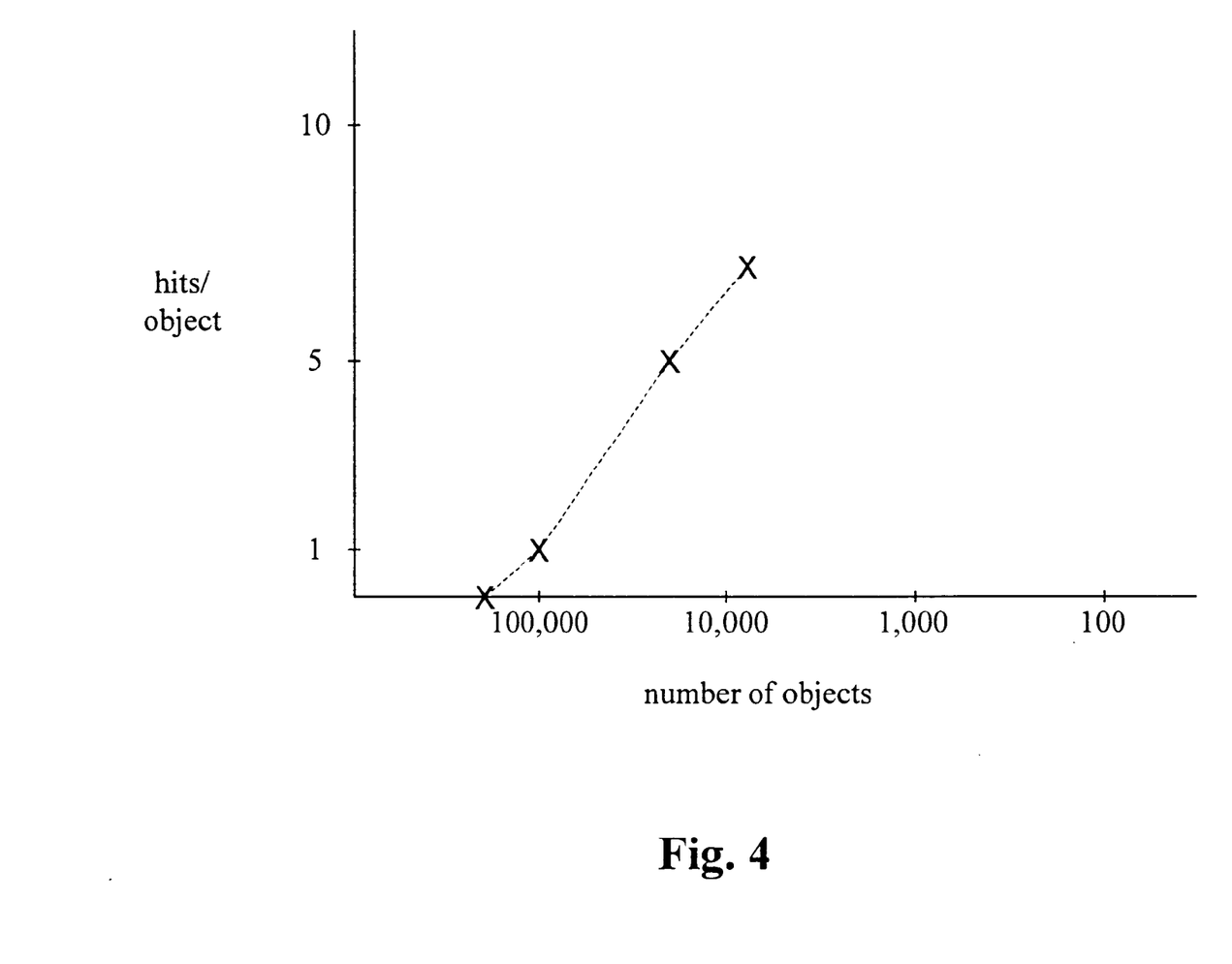
FIG. 4 is an exemplary graph illustrating the number of cache hits per object in a typical cache system.

FIG. 3 is a flowchart 300 illustrating operation of a specific embodiment of the invention. According to one embodiment, statistics are compiled (302) which track the number of cache hits per object requested. FIG. 4 is an exemplary graph illustrating the number of cache hits per object in a typical cache system. As can be seen, the vast majority of requested objects generate one cache hit or less, a great majority of those generating none, i.e., they are only requested once. It is a relatively small number of objects which are responsible for the great majority of cache hits. Without the techniques presented herein, the vast majority of objects cached would be objects for which a subsequent request is never received. However, with the selective caching of the present invention, a much higher percentage of the objects stored in a network cache are likely to be requested again, thus improving cache hit rates and overall caching performance.

The cache-hit statistics are then used to determine a caching threshold (304). That is, a number of cache misses is determined after which a requested object will be cached. This number may vary according to the cache-hit statistics for a specific network, the size of the cache, the data traffic or a number of other parameters. In addition, according to various embodiments of the invention, the compilation and use of cache-hit statistics to determine the caching threshold may be ongoing during normal cache operation. Alternatively, it may be performed once before cache operation is enabled and/or on a periodic basis after the cache is enabled. That is, the caching threshold may be adjusted from its initial setting to be more responsive to current conditions.

Alternatively, the caching threshold may be set manually by the system administrator at any time.

When the cache receives a request for a particular data object (306), it is determined whether the requested object is in the cache (308). If the object is in the cache it is retrieved from the cache memory and transmitted to the requesting host (310). If the object is not in the cache, it is determined whether the cache population is past a certain population threshold (312). That is, the available cache memory capacity is determined. If the cache population is below the population threshold, the data object is retrieved from the destination host identified in the request, transmitted to the requesting host, and cached (318). The purpose of the population threshold is to ensure that the cache fills up more quickly than it would if the caching threshold were in effect even when there is plenty of unused memory in the cache. Thus, the cache does not begin to discriminate between requested objects until the cache is sufficiently full to justify the discrimination.

If, on the other hand, the cache population is past the population threshold (312), it is determined whether the size of the requested object is greater than an object size threshold. If the requested object is larger than the object size threshold, the data object is retrieved from the destination host identified in the request, transmitted to the requesting host, and cached (318). The purpose of the object size threshold is to avoid more than one use of network resources to transmit objects with high network retrieval costs. If the data object is smaller than the object size threshold, it is determined whether, with respect to that particular object, the caching threshold had been reached (316). If the caching threshold has been reached, i.e., there have been the requisite number of cache misses for the requested object, the object is retrieved from the destination host identified in the request, transmitted to the requesting host, and cached (318).

However, if the caching threshold has not been reached, an entry corresponding to the requested object is recorded in a cache miss table (320) and the object is retrieved from the destination host identified in the request, transmitted to the requesting host, but not cached (322).

The cache miss table may comprise a variety of different forms. For example, the cache miss table may be stored in the cache's volatile memory. According to one embodiment, the cache-miss table is similar to the table of contents in the cache file system, each of the entries in the table corresponding to a hash of the destination URL associated with each object. Even though the hash of the URL is not completely unique, the odds are relatively low that more than one object in the cache will correspond to the hash. Where this does occur, the whole URL is compared to each of the stored objects.

According to a specific embodiment, the frequency with which the entire contents of the cache's memory are replaced is monitored for the purpose of adjusting the caching threshold accordingly. According to this embodiment, objects are stored in the cache memory in consecutive regions of the memory on a first-in-first-out (FIFO) basis. When the end of the memory is reached, the writing of new objects to the cache recommences at the beginning of the memory. This is referred to as "wrapping" and is described in greater detail in the above-referenced copending U.S. patent application Ser. No. 08/937,966, now U.S. Pat. No. 5,950,205.

If the memory is wrapping too frequently, it makes sense to increase the caching threshold so that objects which are likely to be requested again are not written over too quickly. Similarly, if the memory is not wrapping very frequently, the caching threshold may be reduced or eliminated to allow caching of any and all requested objects. Thus, the frequency with which the cache memory is wrapped is monitored (324) and the caching threshold is adjusted accordingly (326). Subsequent caching operation may then proceed using the new caching threshold. It will be understood that, despite the location of 324 and 326 in the flowchart of FIG. 3, that monitoring of the disk wrapping frequency and adjustment of the caching threshold may be done at a variety of times and may be done infrequently. Moreover, these functions may be performed automatically by the cache operating system or associated software, or manually by, for example, a system administrator.

Another embodiment effects the improved caching techniques of the present invention in a different manner. Referring again to FIGS. 1 and 2, and as discussed above, during normal operation of a network cache 108, when an object is retrieved from a remote destination platform 106 in response to a request for the object from client platform 100, the object is cached and sent on to the client platform to fulfil the request. During the caching process, the object is first written to a data buffer in the cache's volatile memory, i.e., RAM 204, along with an associated Inode. The Inode is an abstraction of the data in the associated object which provides specific information about that object including, for example, the object name, its memory offset, and the current write pointer location. The object and its associated Inode are then written to one of SCSI drives 210 in turn.

While the object is in the data buffer waiting to be written to nonvolatile memory, it is accessible for servicing subsequent requests to the cache. That is, when the network cache receives a subsequent request for an object which has not yet been written to disk, the object is retrieved from the data buffer and transmitted to the requesting URL. In fact, because the object is in the cache's volatile memory, the service of such a request is faster than if the object had to be retrieved from the slower nonvolatile memory. That is, a network cache performance advantage is realized when requests are serviced from the data buffers in volatile memory. It may be thought of as another level of caching within the network cache itself. The way in which the techniques of the present invention take advantage of this level of caching will now be described with reference to FIG. 5.

Figure 5:
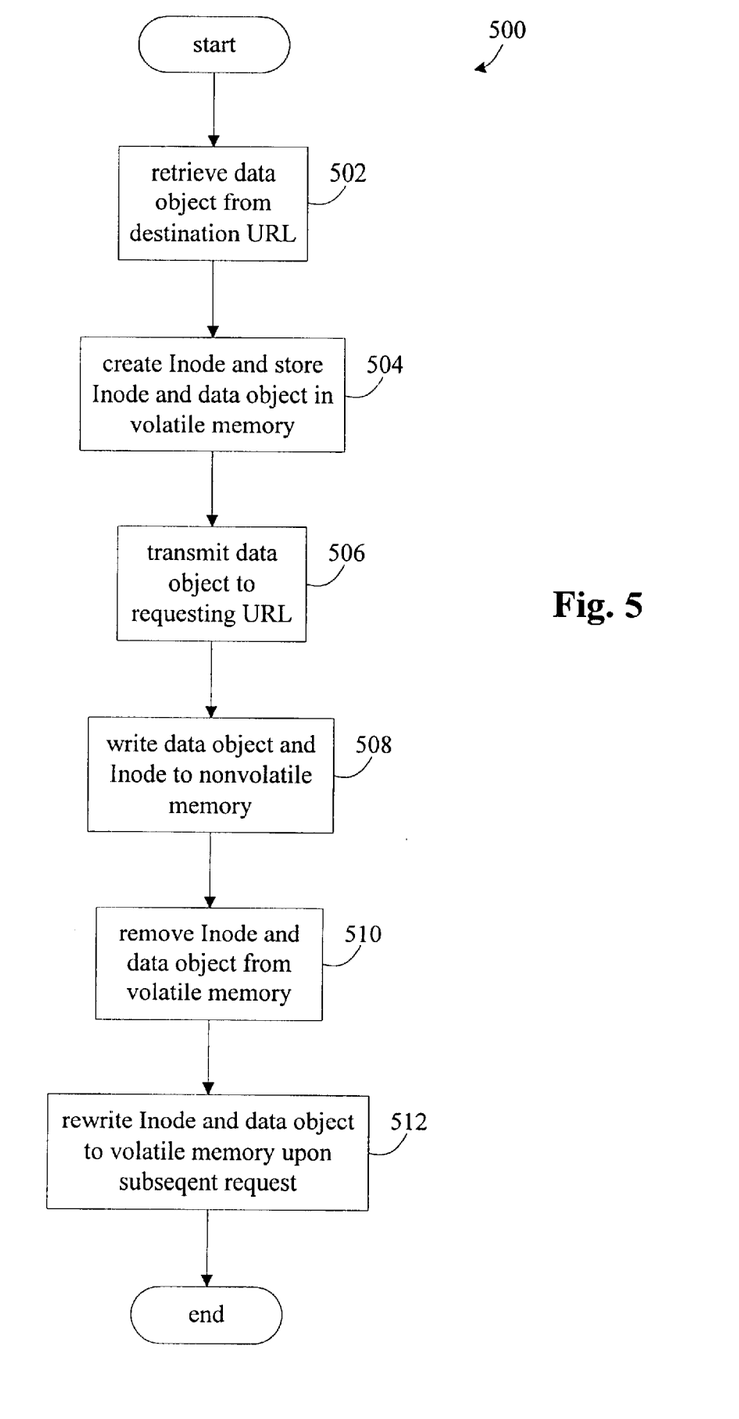
FIG. 5 is a flowchart illustrating the caching of a data object according to a specific embodiment of the invention.

FIG. 5 is a flowchart 500 illustrating the caching of a data object according to a specific embodiment of the invention. It should be noted that at least a portion of the technique illustrated in FIG. 5 may be a specific embodiment of the retrieval and caching of an object (318) of flowchart 300 of FIG. 3. It will be understood, however, that the technique of FIG. 5 may be employed independently of the technique of FIG. 3. Initially, a data object is retrieved from the destination URL (502) specified in the request from the client. An Inode corresponding to the object is created and the Inode and the object are stored in a data buffer in the cache's volatile memory (504) to await writing to the cache's nonvolatile memory. In the mean time, the object is sent to the requesting URL in fulfillment of the request (506). Once the object and its Inode are written from the volatile data buffer to the cache's nonvolatile memory (508), the Inode and the data object are removed from the data buffer (510). A subsequent request for the data object is serviced from the copy in nonvolatile memory at which time the Inode and the data object are rewritten to the data buffer (512). That is, the object and its Inode are read from nonvolatile memory into volatile memory. The effect of this is that only objects for which more than one request has been received are represented in the data buffers. In much the same way as discussed above with reference to FIG. 3, this enhances the hit rates for the level of caching performed within the network cache.

It will be understood that the technique described with reference to FIG. 5 may be implemented independently or in conjunction with the other techniques of the present invention. Moreover, the system level and other metrics applied to enable and/or modify the techniques of the present invention discussed with reference to FIG. 3 may also be used to enable or modify the technique of FIG. 5. For example, the subsequent request upon which an object is rewritten (i.e., read from nonvolatile memory into volatile memory) to the data buffer in volatile memory may be set to be the next request or some later request depending upon hit rate statistics or some other metric such as object size or the current cache population.

While the invention has been particularly shown and described with reference to specific embodiments thereof, it will be understood by those skilled in the art that changes in the form and details of the disclosed embodiments may be made without departing from the spirit or scope of the invention. For example, the embodiment described above with reference to FIG. 3 includes various features such as compilation and use of cache-hit statistics to determine the caching threshold, the use of a cache population threshold, an object size threshold, and adjustment of the caching threshold based on disk wrapping frequency. It will be understood, however, that a particular system may employ none, some, or all of these features without departing from the scope of the invention. It will also be understood that a variety of system level metrics may be employed to enable, disable, or adjust the caching threshold of the present invention. Therefore, the scope of the invention should be determined with reference to the appended claims.

What is claimed is:

1. A method for caching a first data object in a cache, comprising:

in response to a data request for the first data object, determining whether the first data object is currently cached;

where the first data object is not currently cached, determining whether to cache the first data object with reference to a miss count associated with the first data object and maintained by the cache, the miss count corresponding to a number of times a cache miss for the first data object has occurred; and caching the first data object where the first data object is not currently cached and where more than one cache miss corresponding to the first data object has occurred.

2. The method of claim 1 wherein the method is implemented in a network comprising a requesting host which makes the data request, a destination host on which the first data object resides, and the cache.

3. The method of claim 2 wherein the network comprises a wide area network and the requesting host and the destination host are each part of one of a plurality of local area networks.

4. The method of claim 2 wherein the network comprises the Internet to which both the requesting and destination hosts are connected.

5. The method of claim 1 wherein the first data object is cached only where 2 cache misses corresponding to the first data object have occurred.

6. The method of claim 1 wherein the first data object is cached only where 3 cache misses corresponding to the first data object have occurred.

7. The method of claim 1 further comprising, where only one cache miss corresponding to the first data object has occurred, generating the miss count for the first data object.

8. The method of claim 7 wherein the miss count is stored in a table in volatile memory associated with the cache.

9. The method of claim 7 wherein the miss count is stored in a file system associated with the cache.

10. The method of claim 7 further comprising determining whether any previous cache misses corresponding to the first data object have occurred.

11. The method of claim 10 wherein determining whether any previous cache misses have occurred comprises referring to the miss count.

12. The method of claim 1 further comprising:

monitoring request statistics for a plurality of data objects; and determining from the request statistics how many cache misses should occur for a particular data object before the particular data object is cached.

13. The method of claim 1 further comprising:

determining whether a cache population corresponding to an amount of data stored in the cache is below a threshold value; and where the cache population is below the threshold value, caching the first data object without regard to the miss count.

14. The method of claim 1 further comprising:

determining a frequency with which a capacity cache population is overwritten; and determining from the frequency how many cache misses should occur for the first data object before the first data object is cached.

15. The method of claim 1 wherein determining whether the first data object is cached comprises referring to a file system associated with the cache.

16. The method of claim 1 further comprising retrieving the first data object, wherein retrieving the first data object comprises establishing a TCP/IP connection between the cache and a destination host on which the first data object is stored.

17. The method of claim 1 wherein caching the first data object comprises:

writing the first data object to a data buffer in the network cache;

writing the first data object from the data buffer to nonvolatile memory in the network cache; and removing the first data object from the data buffer in response to writing the first data object to the nonvolatile memory.

18. The method of claim 17 further comprising:

in response to a subsequent request for the first data object, servicing the subsequent request from the nonvolatile memory;

rewriting the first data object from the nonvolatile memory to the data buffer.

19. The method of claim 18 further comprising determining a number of requests between the first and subsequent requests with reference to at least one system level metric.

20. The method of claim 18 further comprising determining a number of requests between the first and subsequent requests with reference to hit rate statistics.

21. A computer program product for caching a first data object in a cache, comprising:

at least one computer-readable medium; and a computer program mechanism embedded in the at least one computer-readable medium for causing a computer to:

in response to a data request for the first data object, determine whether the first data object is currently cached;

where the first data object is not currently cached, determine whether to cache the first object with reference to a miss count associated with the first data object and maintained by the cache, the miss count corresponding to a number of times a cache miss for the first data object has occurred; and cache the first data object where the first data object is not currently cached and where more than one cache miss corresponding to the first data object has occurred.

22. An apparatus for caching a first data object in a cache, comprising:

means for determining whether the first data object is currently cached in response to a data request for the first data object;

means for determining whether to cache the first object with reference to a miss count associated with the first data object and maintained by the cache where the first data object is not currently cached, the miss count corresponding to a number of times a cache miss for the first data object has occurred; and means for caching the first data object where the first data object is not currently cached and where more than one cache miss corresponding to the first data object has occurred.

23. A network cache, comprising:

cache memory for storing a plurality of data objects;

an operating system which is operable to determine whether the first data object is currently cached in response to a data request for the first data object;

determine whether to cache the first object with reference to a miss count associated with the first data object and maintained by the cache where the first data object is not currently cached, the miss count corresponding to a number of times a cache miss for the first data object has occurred; and cache the first data object where the first data object is not currently cached and where more than one cache miss corresponding to the first data object has occurred.

24. A method for caching a first data object in a cache in a network, comprising:

monitoring cache hit statistics for a plurality of data objects on the network;

determining from the cache hit statistics that a first number of cache misses should occur for the particular data object before the particular data object is stored in the cache;

in response to a data request for the first data object from a requesting host on the network, determining whether the first data object is currently cached; and where the first data object is not currently cached and where the first number of cache misses corresponding to the first data object have occurred, caching the first data object.

25. A method for caching a first data object in a network cache, comprising:

receiving a first request for the first data object from a requesting host;

where the first data object is not currently cached in the network cache and in response to the first request, retrieving the first data object and transmitting the first data object to the requesting host without caching the first data object in the network cache;

making an entry in the network cache indicating that at least one cache miss corresponding to the first data object has occurred;

receiving a subsequent request for the first data object; and where the first data object is not currently cached in the network cache and in response to the subsequent request, retrieving the first data object, transmitting the first data object to the requesting host, and, in response to the entry indicating at least one cache miss, caching the first data object in the network cache.

26. A computer program product for caching a first data object in a cache in a network, comprising:

at least one computer-readable medium; and a computer program mechanism embedded in the at least one computer-readable medium for causing a computer to:

monitor cache hit statistics for a plurality of data objects on the network;

determine from the cache hit statistics that a first number of cache misses should occur for the particular data object before the particular data object is stored in the cache;

in response to a data request for the first data object from a requesting host on the network, determine whether the first data object is currently cached; and where the first data object is not currently cached and where the first number of cache misses corresponding to the first data object have occurred, cache the first data object.

27. An apparatus for caching a first data object in a cache in a network, comprising:

means for monitoring cache hit statistics for a plurality of data objects on the network;

means for determining from the cache hit statistics that a first number of cache misses should occur for the particular data object before the particular data object is stored in the cache;

means for determining whether the first data object is currently cached in response to a data request for the first data object from a requesting host on the network; and means for caching the first data object where the first data object is not currently cached and where the first number of cache misses corresponding to the first data object have occurred.

28. A network cache, comprising:

cache memory for storing a plurality of data objects; and an operating system which is operable to:

monitor cache hit statistics for a plurality of data objects on a network;

determine from the cache hit statistics that a first number of cache misses should occur for the particular data object before the particular data object is stored in the network cache;

in response to a data request for the first data object from a requesting host on the network, determine whether the first data object is currently cached; and where the first data object is not currently cached and where the first number of cache misses corresponding to the first data object have occurred, cache the first data object.

29. A computer program product for caching a first data object in a network cache, comprising:

at least one computer-readable medium; and a computer program mechanism embedded in the at least one computer-readable medium for causing a computer to:

receive a first request for the first data object from a requesting host;

where the first data object is not currently cached in the network cache and in response to the first request, retrieve the first data object and transmit the first data object to the requesting host without caching the first data object in the network cache;

make an entry in the network cache indicating that at least one cache miss corresponding to the first data object has occurred;

receive a subsequent request for the first data object; and where the first data object is not currently cached in the network cache and in response to the subsequent request, retrieve the first data object, transmit the first data object to the requesting host, and, in response to the entry indicating at least one cache miss, cache the first data object in the network cache.

30. An apparatus for caching a first data object in a network cache, comprising:

means for receiving a first request for the first data object from a requesting host;

means for retrieving the first data object and transmitting the first data object to the requesting host without caching the first data object in the network cache where the first data object is not currently cached in the network cache and in response to the first request;

means for making an entry in the network cache indicating that at least one cache miss corresponding to the first data object has occurred;

means for receiving a subsequent request for the first data object; and means for retrieving the first data object, transmitting the first data object to the requesting host, and, in response to the entry indicating at least one cache miss, caching the first data object in the network cache where the first data object is not currently cached in the network cache and in response to the subsequent request.

31. A network cache, comprising:

cache memory for storing a plurality of data objects; and an operating system which is operable to:

receive a first request for the first data object from a requesting host;

where the first data object is not currently cached in the network cache and in response to the first request, retrieve the first data object and transmit the first data object to the requesting host without caching the first data object in the network cache;

make an entry in the network cache indicating that at least one cache miss corresponding to the first data object has occurred;

receive a subsequent request for the first data object; and where the first data object is not currently cached in the network cache and in response to the subsequent request, retrieve the first data object, transmit the first data object to the requesting host, and, in response to the entry indicating at least one cache miss, cache the first data object in the network cache.

* * * * *